Aug. 29, 1933.     E. WALMSLEY ET AL     1,924,338
ANTIDAZZLE DEVICE
Filed April 18, 1931
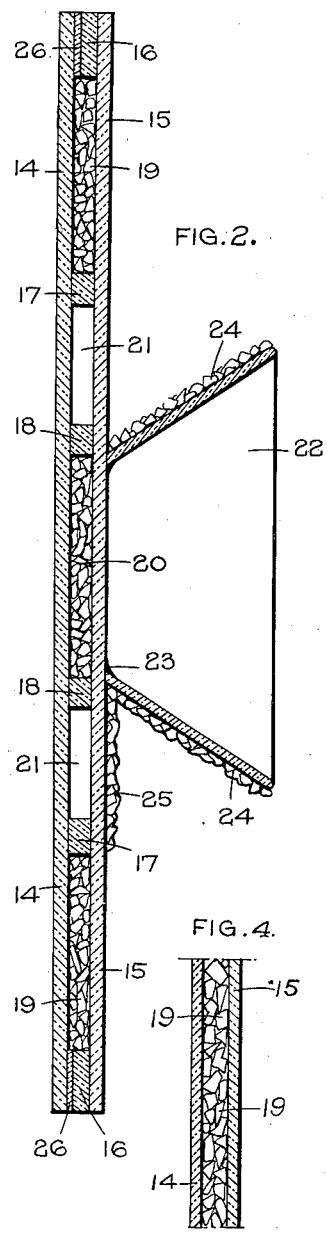
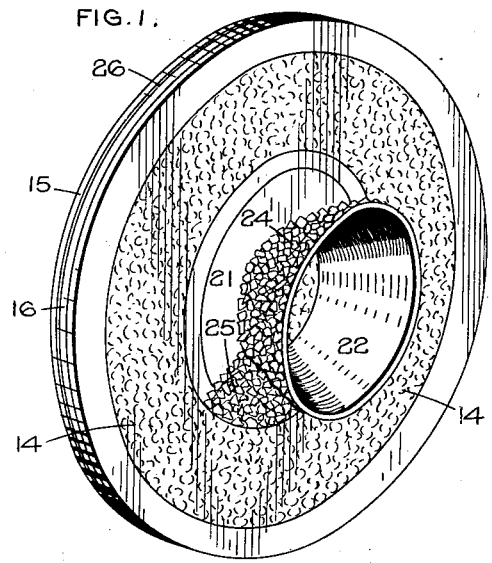
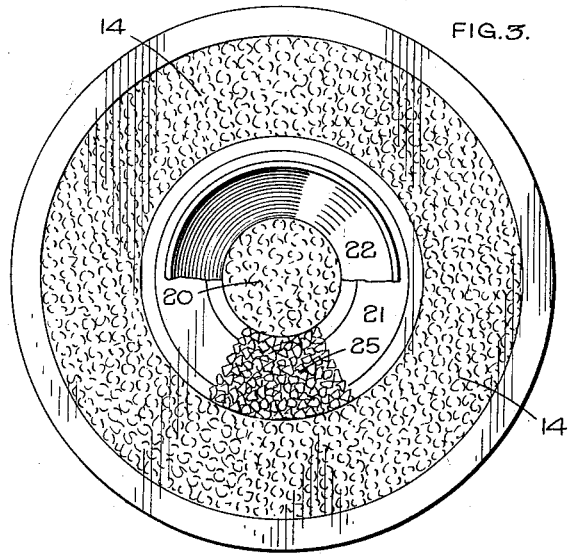
Inventors:
Edgar Walmsley
Henry A. Francis
by Richard E. Babcock
Attorney Patented Aug. 29, 1933

1,924,338

UNITED STATES PATENT OFFICE 1,924,338

ANTIDAZZLE DEVICE

Edgar Walmsley and Henry Alfred Francis, Blackpool, England

Application April 18, 1931, Serial No. 531,192, and in Great Britain April 25, 1930

6 Claims. (Cl. 240—41.4)

This invention relates to anti-dazzle devices for application to vehicle lamps to prevent dazzling the eyes of the drivers of oncoming vehicles, and refers more particularly to that class of such which include a disc of translucent material which is adapted to be mounted in front of the source of light to diffuse or refract the light rays.

The primary object of the present invention is to provide an improved construction of antidazzle device of the above class which will more effectively prevent dazzle and diffuse the concentrated glare from the reflector of the vehicle lamp, but with which a relatively long "driving beam" of light can be obtained directed on to the surface of the road.

With this object in view our invention comprises the following features of construction and position of the antidazzle member as will be hereinafter described with reference to the accompanying drawing within.

Referring to the drawing:—

Figure 1 is a perspective view illustrating one embodiment of our invention.

Figure 2 is a vertical section of same to an enlarged scale.

Figure 3 is a rear elevation of same partially broken away.

Figure 4 is a section showing the construction of the light diffusing member.

In the constructions illustrated a light filter adapted for use with a vehicle lamp comprises two discs 14 and 15 of transparent or translucent material such as for instance celluloid or glass, the discs being spaced apart by means of spacing rings 16 at their peripheries and additional spacing rings 17 and 18 disposed somewhat nearer their centres.

The space intermediate the discs 14 and 15 and between the rings 16 and 17 is packed with light refracting and diffusing material 19 whilst the space enclosed by the ring 18 between the discs 14 and 15 is similarly provided with a filling 20. The layer of material 20 is preferably somewhat finer and more closely packed than the outer layer 19.

Between the rings 17 and 18 is a clear transparent portion 21 through which light can pass easily and give a good driving beam, this clear portion being however covered at its lower portion in a manner hereinafter described to prevent the free passage of light therethrough.

The disc 15 is provided with a rearwardly projecting conical member 22 which is conveniently formed from celluloid or glass and which is secured to the rear of the disc 15 at 23 by means of amyl acetate or other suitable adhesive.

The member 22 is disposed substantially centrally of the device and when the light filter is in position in the lamp casing the member 22 projects towards the electric bulb of the lamp.

The member 22 is provided with a light diffusing coating 24 of light refracting or diffusing material, this coating 24 being disposed upon the exterior of the member 22 and secured thereon by means of amyl acetate or other suitable adhesive.

The broken glass or like coating also extends over the lower part of the clear portion 21 and beneath the part 22 as shown at 25 to prevent dazzle from the lower part of the reflector, the part 25 being of substantially sector shape.

The discs 14 and 15 in this construction have a smooth exterior surface and the discs, rings, and light diffusing material are all secured together by means of amyl acetate or other suitable adhesive.

A ring of coloured celluloid or other material 26 is placed between the discs 14 and 15.

Either the supporting sheets or the light diffusing material or both may if desired be coloured in any suitable manner to suit any particular purpose for which the medium is proposed to be used, or to provide any particular driving light.

It is found in actual practice that a light filter constructed in accrodance with any of the forms described is of considerable use when employed in conjunction with illuminated signs and when applied to vehicle lamps forms an effective means to prevent dazzling the eyes of the drivers of other vehicles.

What we claim then is:—

1. An anti-dazzle device for vehicle lamps comprising a light diffusing disc having an annular light diffusing portion and a central transparent portion, a translucent member of conical form secured to the disc to protect the transparent portion against direct rays of light from the lamp, the light diffusing portion of the disc comprising a layer of particles of broken glass having a large number of facets, a sheet of transparent material on one side of said layer, a further sheet of transparent material on the other side of said layer so that the layer is enclosed between said sheets, and an adhesive cementing agent for uniting said sheets.

2. An anti-dazzle device for vehicle lamps comprising a light diffusing disc having an annular light diffusing portion and a central transparent portion, a translucent member secured to the disc to protect the transparent portion against direct rays of light from the lamp, said translucent member being of hollow part conical form, the light diffusing portion of the disc comprising a layer of particles of broken glass having a large number of facets, a sheet of transparent material on one side of said layer, a further sheet of transparent material on the other side of said layer so that the layer is enclosed between said sheets, and an adhesive cementing agent for uniting said sheets.

3. An anti-dazzle device for vehicle lamps comprising a light diffusing disc having an annular light diffusing portion and a central transparent portion, a translucent member secured to the disc to protect the transparent portion against direct rays of light from the lamp, said translucent member being of part conical form with the end of smaller diameter adjacent the disc, the light diffusing portion of the disc comprising a layer of particles of broken glass having a large number of facets, a sheet of transparent material on one side of said layer, a further sheet of transparent material on the other side of said layer so that the layer is enclosed between said sheets, and an adhesive cementing agent for uniting said sheets.

4. An anti-dazzle device for vehicle lamps comprising a light diffusing disc having an annular light diffusing portion and a central transparent portion, a translucent member secured to the disc to protect the transparent portion against direct rays of light from the lamp, said translucent member comprising a part conical member of transparent material, a layer of granulated light diffusing material and means for attaching said granulated material to said part conical member, the light diffusing portion of said disc comprising a layer of granulated light diffusing material, a sheet of transparent material on one side of said layer, and a further sheet of transparent material on the other side of said layer so that the layer is enclosed between said sheets.

5. An anti-dazzle device for vehicle lamps comprising a light diffusing disc having an annular light diffusing portion and a central transparent portion, a translucent member secured to the disc to protect the transparent portion against direct rays of light from the lamp, said translucent member comprising a hollow part conical member of glass, a layer of particles of broken glass and means for attaching said broken glass to said part conical member, the light diffusing portion of said disc comprising a layer of granulated light diffusing material, a sheet of transparent material on one side of said layer, and a further sheet of transparent material on the other side of said layer so that the layer is enclosed between said sheets.

6. An anti-dazzle device for vehicle lamps comprising a light diffusing disc having an annular light diffusing portion and a central transparent portion, a translucent member secured to the disc to protect the transparent portion against direct rays of light from the lamp, said translucent member comprising a hollow part conical member of glass, a layer of particles of broken glass and means for attaching said broken glass to said part conical member, the light diffusing portion of said disc comprising a layer of granulated light diffusing material, a sheet of transparent material on one side of said layer, a further sheet of transparent material on the other side of said layer so that the layer is enclosed between said sheets, and means for connecting said translucent member to the disc with the end of smaller diameter adjacent to disc.

EDGAR WALMSLEY.
HENRY ALFRED FRANCIS.